United States Patent [19]

Fladerer et al.

[11] Patent Number: 4,542,503

[45] Date of Patent: Sep. 17, 1985

[54] ARRANGEMENT FOR THE SYNCHRONOUS DEMULTIPLEXING OF A TIME DIVISION MULTIPLEX SIGNAL

[75] Inventors: Heinrich Fladerer, Planegg; Johann Magerl, Munich, both of Fed. Rep. of Germany

[73] Assignee: Siemens Aktiengesellschaft, Berlin & Munich, Fed. Rep. of Germany

[21] Appl. No.: 522,017

[22] Filed: Aug. 11, 1983

[30] Foreign Application Priority Data

Aug. 12, 1982 [DE] Fed. Rep. of Germany ....... 3230064

[51] Int. Cl.[4] .............................. H04J 3/06; H04J 3/00
[52] U.S. Cl. ...................................... 370/100; 370/84; 370/91; 375/114
[58] Field of Search ...................... 370/100, 58, 85, 84, 370/91, 112; 375/114

[56] References Cited

U.S. PATENT DOCUMENTS

| | | | |
|---|---|---|---|
| 4,179,587 | 12/1979 | Herschtal | 370/91 |
| 4,224,473 | 9/1980 | Kaul et al. | 370/84 |
| 4,313,198 | 1/1982 | Mazzocchi | 370/100 |
| 4,317,198 | 2/1982 | Johnson | 370/84 |
| 4,432,087 | 2/1984 | Hubbard | 370/84 |
| 4,460,993 | 7/1984 | Hampton et al. | 370/84 |

FOREIGN PATENT DOCUMENTS 2856565 1/1981 Fed. Rep. of Germany .
3035645 4/1982 Fed. Rep. of Germany .
2063626 6/1981 United Kingdom .

OTHER PUBLICATIONS

CCITT Yellow Book, vol. III, pp. 218-224.
Bekert F., et al, "Digitalsignal-Multiplexgeräte DSMX2/8, DSMX8/34 und DSMX34/139", Telcom Report 2 (1979), pp. 59-64.

Primary Examiner—Douglas W. Olms
Assistant Examiner—Curtis Kuntz
Attorney, Agent, or Firm—Hill, Van Santen, Steadman & Simpson

[57] ABSTRACT

A time division multiplex signal of a high order with a frame code word occurring as a block is distributed between a plurality of channels in a demultiplexer by way of a chain circuit of conductor elements. Further on the transmission path contains memories and a channel distributor. The channel distributor is controlled by a second memory by way of a decoder, other memories and a coder in a single step. A logic linking arrangement and a frame counter permit resynchronization only when the frame code word has failed to appear four times. The synchronous multiplexer facilitates high-speed operation at bit rates of 140 Mbit/s and 565 Mbit/s and likewise permits construction in accordance with emitter-coupled logic technology.

16 Claims, 9 Drawing Figures

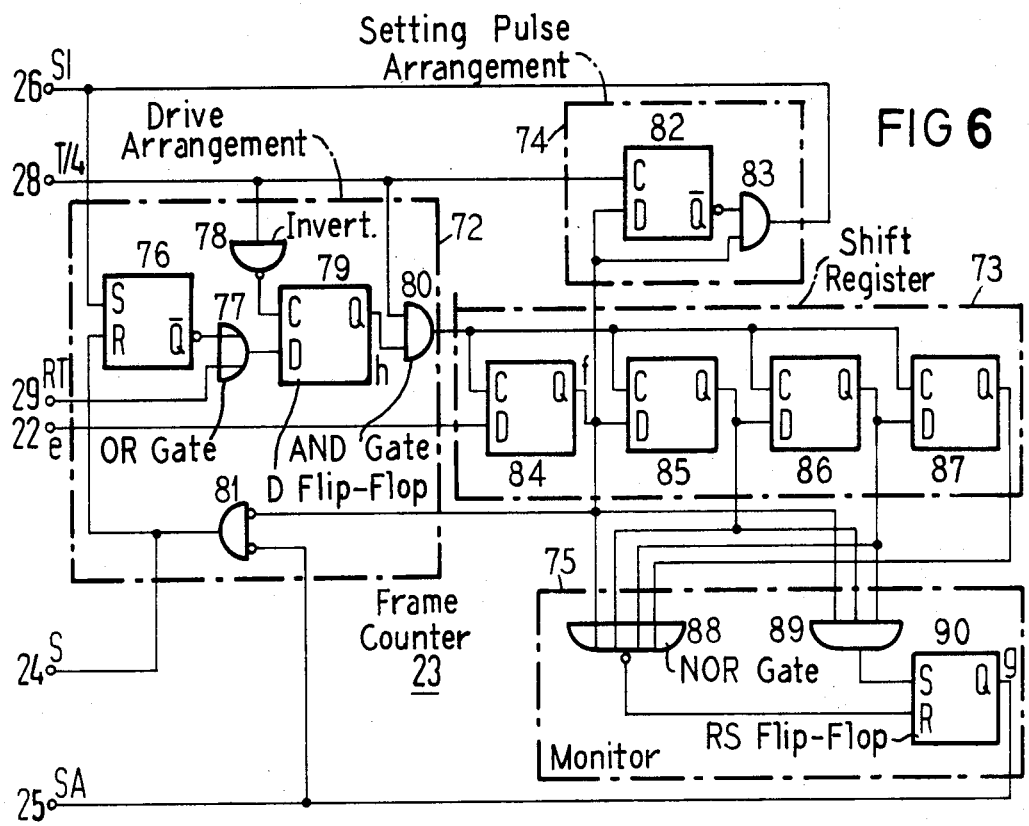
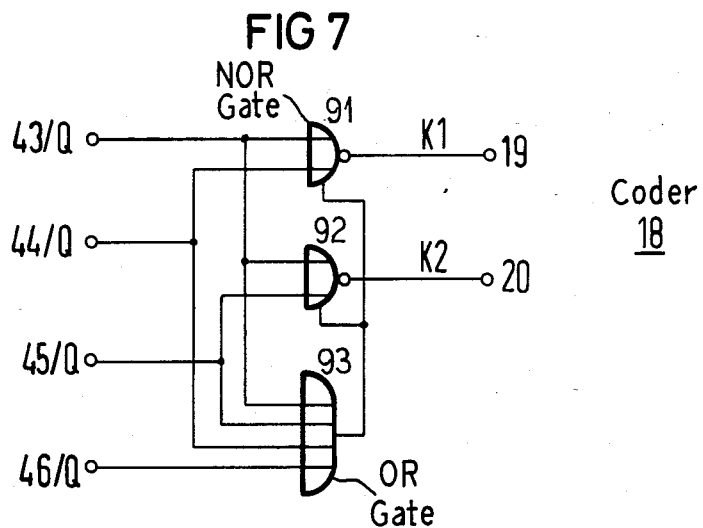

ARRANGEMENT FOR THE SYNCHRONOUS DEMULTIPLEXING OF A TIME DIVISION MULTIPLEX SIGNAL

CROSS REFERENCE TO RELATED APPLICATION

This application is related to an application, Ser. No. 513,402, filed July 14, 1983.

BACKGROUND OF THE INVENTION

1. Field of the Invention

The present invention relates to an arrangement for the bit-wise synchronous demultiplexing of a time division multiplex (TDM) signals in frame code words which occur as blocks.

2. Description of the Prior Art

Arrangements of the general type set forth above are known from the publication "Telecom Report", 2, 1979, special issue digital transmission, pp. 59–64, for a bit rate of up to 139 Mbit/s.

Heretofore series-parallel conversion has been carried out by shift registers in such a manner that the items of data are input consecutively into the shift register and read in parallel at times which represent a whole multiple of the input clock pulse rate. A demultiplexer which can be used in a practical manner is described in the German Pat. No. 28 56 565. Since the data recognition time (set-up and hold time) of the storage elements used must be sufficiently short in relation to the bit length of the serial TDM signal which is to be distributed, high-speed flip-flops exhibiting a correspondingly high power loss are required for a bit sequence of, for example, 565 Mbit/s.

As may be appreciated from the aforementioned publication, the synchronization has been carried out at the input of the demultiplexer. However, speed-related difficulties occur when the bit sequence of the TDM signal amounts to 565 Mbit/s.

SUMMARY OF THE INVENTION

The object of the present invention is to provide a synchronous demultiplexer which is suitable for a high bit sequence and which fulfills the CCITT recommendation as given in the Yellow Book Vol. III, pp. 219–220 (Fascicle 111.3, Rec. G 922, Section 3.4). In addition, as large as possible a portion of the arrangement is to be able to be constructed in integrated circuitry (gate array) in emitter coupled logic (ECL) technology.

In accordance with the above-mentioned CCITT recommendation, the channel assignment may not be altered until the frame code word has failed to be recognized four times in succession.

Beginning with an arrangement of a type described above, the above object is achieved in accordance with the invention in that at the input end there is provided a chain circuit which comprises n−1 conductor elements which are subject to a signal transit time of one bit length of the TDM signal, that in the adjoining transmission path there are provided a first memory which possesses n D-flip-flops, whose input is connected either to the input of the chain circuit or to the output of one conductor element, a second memory, a third memory, a channel distributor connected to the second memory and to the third memory, and a fourth memory. In the control path between the second memory and the channel distributor there are arranged a decoder, a fifth memory, a sixth memory and a coder, and following the fifth and sixth memories there is provided a logic linking arrangement connected at its output end to a frame counter which controls the sixth memory and the logic linking arrangement.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 6 is a schematic circuit diagram of a frame counter;

FIG. 7 is a schematic circuit diagram of a coder;

DESCRIPTION OF THE PREFERRED EMBODIMENTS

Figure 1:
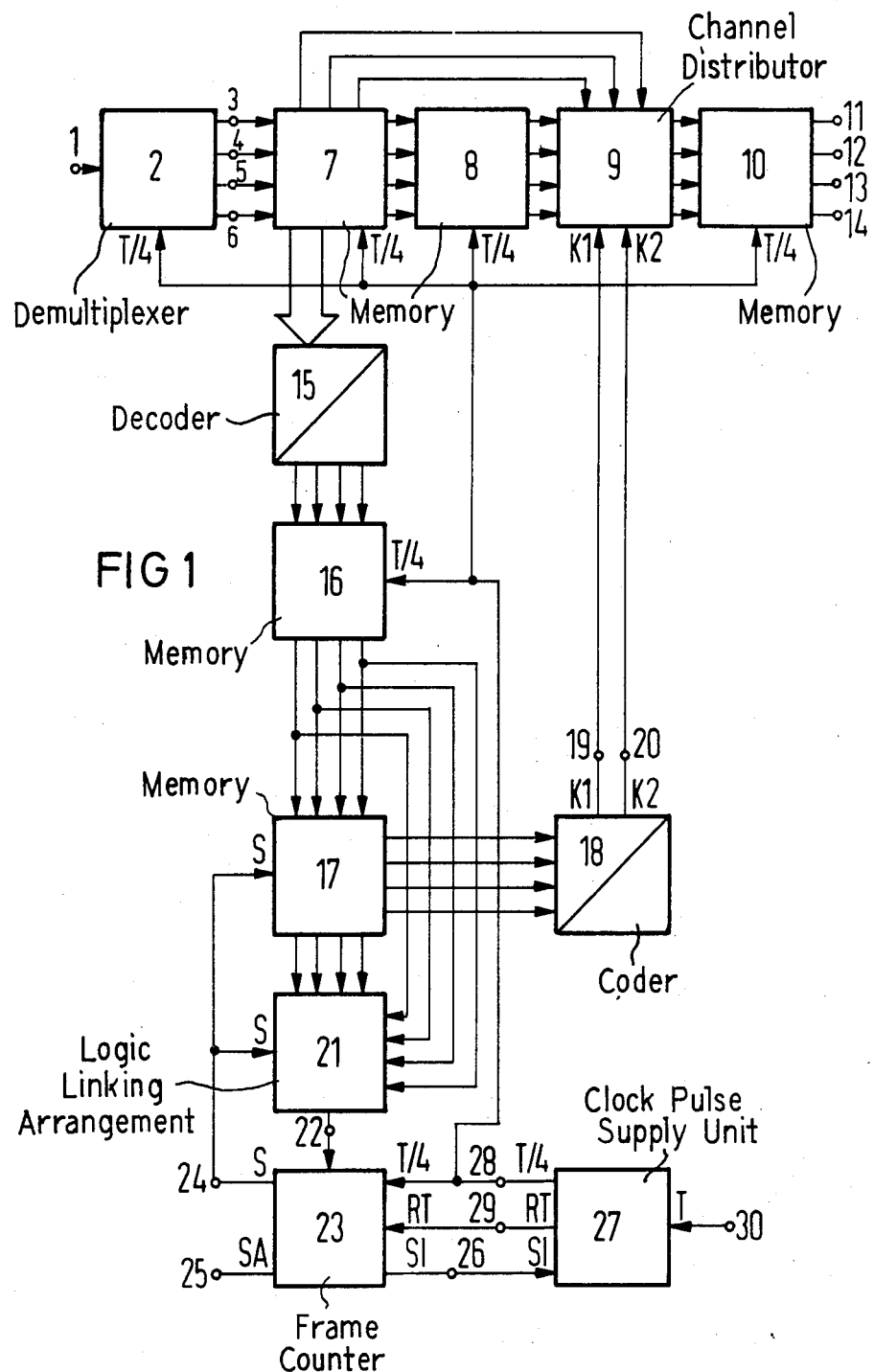
FIG. 1 is a schematic block diagram of a synchronous demultiplexer constructed in accordance with the present invention.

FIG. 1 represents an exemplary embodiment of the synchronous demultiplexer constructed in accordance with the present invention and operable at a rate of 565 Mbit/s. The arrangement comprises an input 1, a demultiplexer 2 having a first memory 39 (FIG. 2), further memories 7, 8, 10, 16 and 17, a channel distributor 9, outputs 11–15, a decoder 15, a coder 18, a logic linking arrangement 21, a frame counter 23, and a clock pulse supply unit 27 having an input 30.

The mode of operation of the arrangement illustrated in FIG. 1 will be explained, together with the detailed arrangements represented in FIGS. 2–6 and the pulse schedule shown in FIG. 9.

Figure 2:
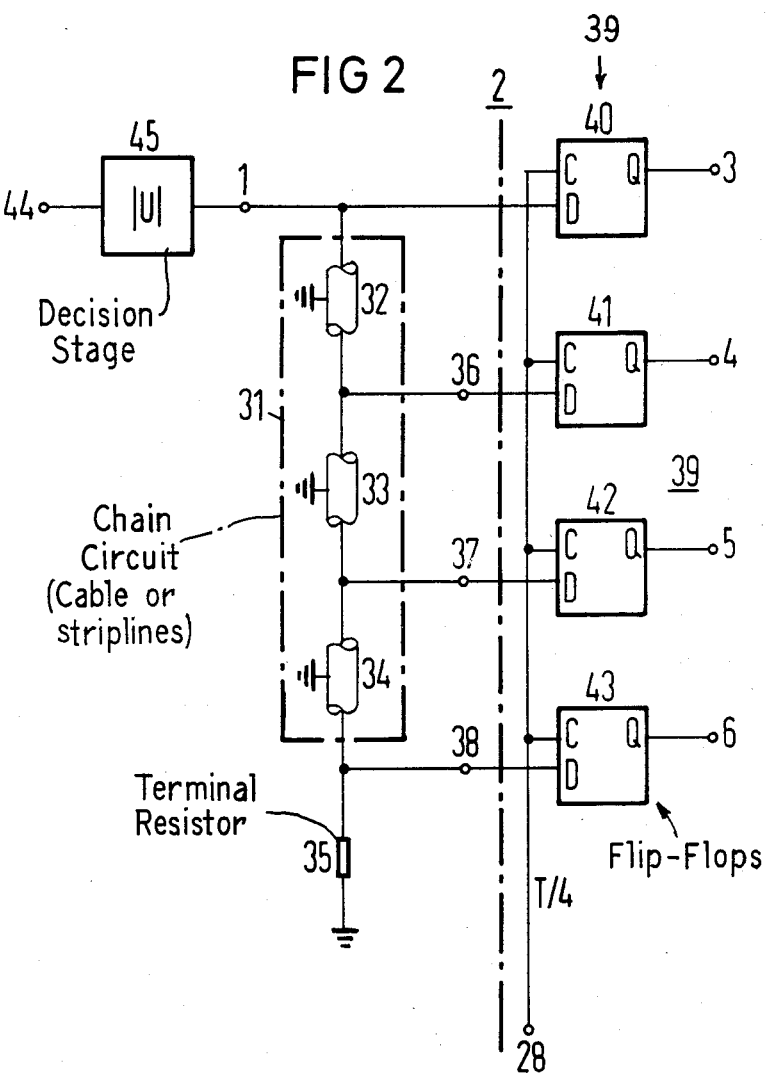
FIG. 2 is a detailed circuit diagram of the demultiplexer, together with the series-parallel converter and the first memory.

FIG. 2 comprises a chain circuit 31 including conductor elements 32–34, a terminal resistor 35 whose value amounts to that of the surge impedance of the chain circuit 31, a first memory 39 including D-flip-flops 40–43 having outputs 3–6, and a common clock pulse input 28. In addition, the input 1 is preceded by a decision stage 45 having an input 44. The delay elements may advantageously comprise a conductor element having a surge impedance of 50, 60, or 75 ohm and may comprise strip lines supported on a carrier and having a shortening factor in the range of 3–5.

Figure 3:
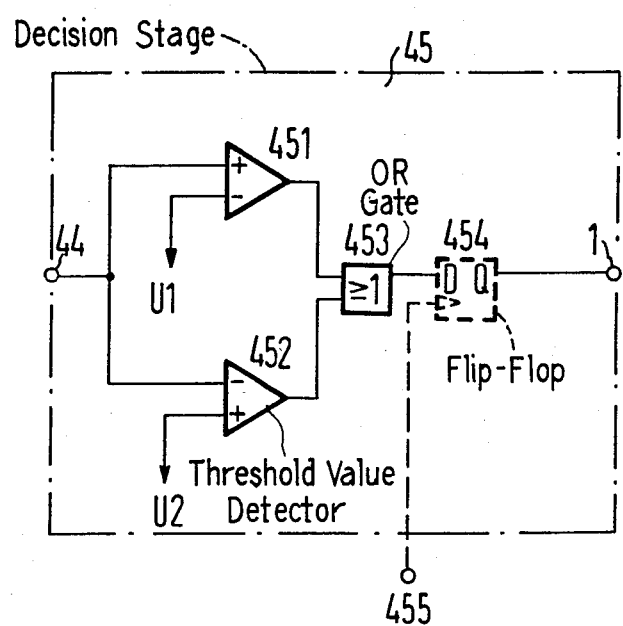
FIG. 3 is a schematic circuit diagram of a decision stage.

In accordance with FIG. 3, the decision stage 45 comprises two threshold value detectors 451 and 452, one OR gate 453, and for high bit rates a D-flip-flop 454 clocked at an input 455. The threshold value detector 451 emits a logic "1" whenever the threshold U1 is exceeded, as does the threshold value detector 452 whenever the threshold U2 is exceeded.

Figure 4:
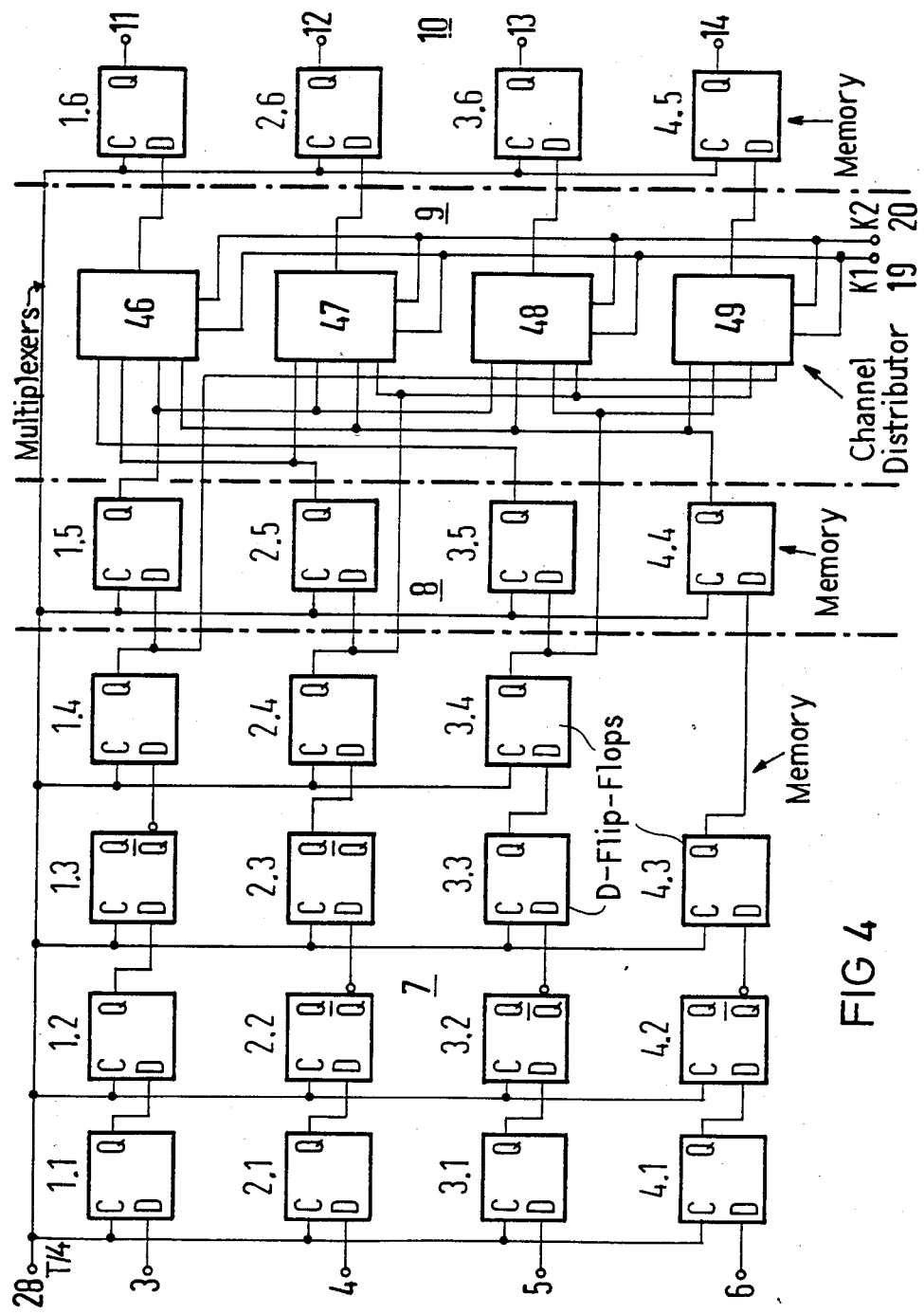
FIG. 4 is a detailed circuit diagram showing those components of the arrangement located further on in the transmission path.

FIG. 4 represents the adjoining transmission path between the inputs 3–6 and the outputs 11–14, with the memory 7, 8, 10 and the channel distributor 9. The D-flip-flops are referenced by two characters linked by a decimal point. The first character refers to the channel, whereas the second character refers to the position of the D-flip-flop in the direction of transmission. A plurality of multiplexers 46–49, are provided which have control inputs 19 and 20.

Figure 5:
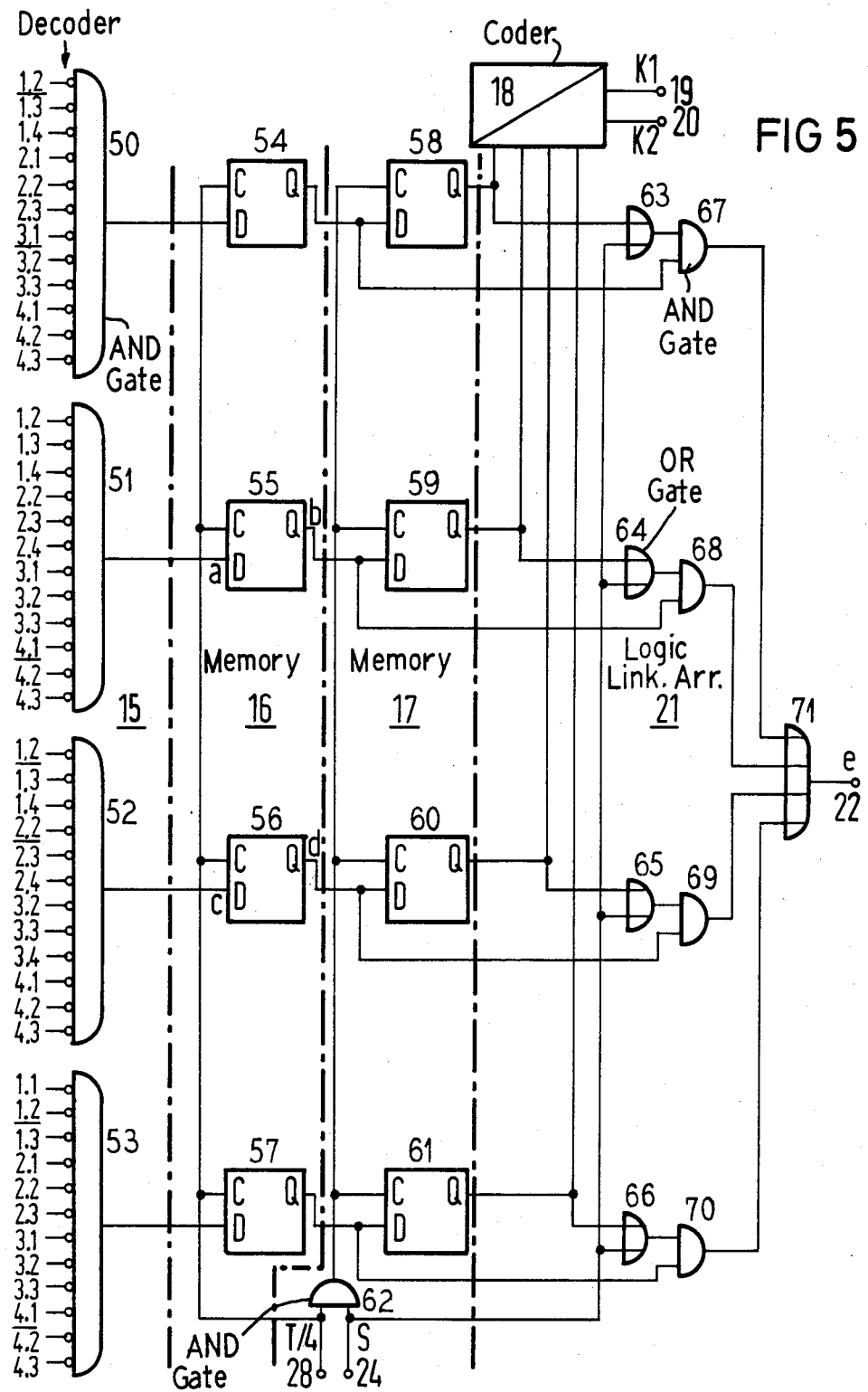
FIG. 5 illustrates, in detail, those components of the arrangement which are located in the control path of the channel distribution unit.

FIG. 5 provides a detailed view of the decoder 15, the memories 16 and 17, the logic linking arrangement 21 and the coder 18.

The decoder 15 comprises four AND gates 50–53 whose inputs are connected to Q or $\overline{Q}$ outputs of D-flip-flops as shown in FIG. 4. A stroke above the D-flip-flop reference indicates output from the inverted output $\overline{Q}$.

The memory 16 and 17 each comprise four D-flip-flops 54–57 and 58–61, respectively. The clock pulse inputs of the D-flip-flops 54–57 in the memory 16 are connected to a clock pulse terminal 28, whereas the clock pulse inputs of the D-flip-flops 58–61 of the memory 17 are connected to the output of an AND gate 62. One input of the AND gate 62 is connected to the clock pulse input 28, whereas the other input is connected to a control signal input 24.

The logic linking arrangement 21 comprises OR gates 63–66 and 71, AND gates 67–70, and an output 22.

FIG. 6 illustrates the frame counter 23, with a drive arrangement 72, a shift register 73, a setting pulse arrangement 74, and a monitoring arrangement 75.

The drive arrangement 72 comprises a RS flip-flop 76, an OR gate 77, an inverter 78, a D-flip-flop 79, an AND gate 80 and an AND gate 81 having inverting inputs. The setting pulse arrangement 74 comprises a D-flip-flop 82 and an AND gate 83. The shift register 73 comprises four D flip-flops 84–87. The monitoring arrangement 75 comprises a NOR gate 88, an AND gate 89 and a RS flip-flop 90.

If an alternate-mark-inversion (AMI) coded TDM signal is applied to the input 44 of FIG. 2, the signal is converted in the decision stage 45 into a binary TDM signal. This passes by way of the input 1 of FIGS. 1 and 2 into the demultiplexer 2. As can be seen from FIG. 2, the TDM signal passes to the chain circuit 31. The individual conductor elements 32–34 are subject to a signal transit time which corresponds to one bit length of the TDM signal at the input 1. For example, with a bit sequence of 565 Mbit/s, conductor elements in the form of cables possess a length of approximately 40 cm. However, strip lines on a carrier having a high shortening factor can be substantially shorter in length.

The clock pulse train T, divided by 4, of the TDM signal present at the input 1 is applied to the input 28. With this clock pulse frame T/4, the four D-flip-flops 40–43 receive the signals at the outer terminals 1 and 38, and at the tappings 36 and 37 of the chain circuit 31 and feed these signals to the outputs 3–6.

FIG. 4 illustrates the continued transmission path. In the first channel, the memory 7 contains four D-flip-flops 1.1–1.4, in the second channel four D-flip-flops 2.1–2.4, in the third channel four D flip-flops 3.1–3.4 and in the fourth channel three D-flip-flops 4.1–4.3. In order to simplify the memory 7, a number of space-saving D-flip-flops without inverting outputs $\overline{Q}$ have been used. To enable the use of a simple decoder 15, following the D-flip-flops 1.3, 2.2, 3.2 and 4.2, the items of data are advanced in inverted form. As a result, it is only these D-flip-flops and the D-flip-flop 2.3 for the decoding which require an inverting output $\overline{Q}$ in addition to the non-inverting output Q. In the 15 D-flip-flops of the memory 7, a twelve-digit frame code word 111110100000 can occur in the four adjacent overlapping positions. In the first position it is contained in the D-flip-flops 3.4, 2.4, 1.4, 4.3, 3.3, 2.3, 1.3, 4.2, 3.2, 2.2, 1.2 and 4.1 in the sequence of the frame code word. In the second position it is located in the D-flip-flops 2.4 and 3.1, in the third position between the D-flip-flops 1.4 and 2.1 and in the fourth position between the D-flip-flops 4.3 and 1.1.

The outputs of the D-flip-flops of the memory 7 are loaded by D-flip-flops which follow in the transmission path and by the connected AND gates 50–53 of the decoder 15 illustrated in FIG. 5. At a transmission speed of 140 Mbit/s or 565 Mbit/s, an excessive load leads to impermissible operating conditions which result in a functional breakdown. Therefore, prior to the channel distribution, the four diverted TDM signals are advanced by one step which can be effected by the second memory 8.

The channel distributor 9 is now merely connected to the D-flip-flops 1.4, 2.4, 3.4, 1.5, 2.5, 3.5 and 4.4 which are subject to a lighter load.

In the channel distributor 9, in accordance with the code word applied to the control inputs 19 and 20, the four multiplexers 46–49 detect the synchronous member of the four positions which they switch through via the memory 10 to the outputs 11–14. Because of a high bit rate intermediate storage is necessary. The D-flip-flops 1.6, 2.6, 3.6 and 4.5 emit the data signals in inverted form because of the construction of the memory 7.

In the decoder 15 represented in FIG. 5, one of the AND gates 50–53 detects the frame code word and emits a signal to a following D-flip-flop in the memory 16. This signal is fed by way of the following D-flip-flops in the memory 17 to the coder 18 and to the logic linking arrangement 21 whenever a control signal S from the frame counter 23 is present at the input 24. This is the case when the arrangement is not operating synchronously and the information "no frame code word recognized" is stored in the D-flip-flop 84 in the shift register 73 (FIG. 6). The coder 18 converts the signals with which it is presented into a code K1, K2 for the control of the channel distributor 9.

In the non-synchronous state, the logic linking arrangement 21 switches through all the inputs of the memory 17 to its output 22. With the first frame code word which is recognized, the corresponding output signal of the memory 16 is stored in the following D-flip-flop of the memory 17 and is forwarded to the output 22 by way of which it reaches the frame counter 23. The control signal S now adopts the logic state "0" as a result of which the clock pulse supply of the memory 17 is disconnected and signals can now only reach the output 22 by way of the switch-through channel. The synchronous state is reached when three frame code words have been recognized. The situation does not change until the control signal S assumes the logic state "1" and switches through all of the OR gates 63–66.

The output signals of the logic linking arrangement 21, which signify "frame code word recognized" are fed by way of the terminal 22 (FIG. 6) into the shift register 73 of the frame counter 23. The shift register 73 is pulsed by the output pulses of the drive arrangement 72.

The RS flip-flop 76 is set by a setting pulse S1 of the setting pulse arrangement 74. It is reset when the arrangement is non-synchronous and the D-flip-flop 84 has stored the information "no frame code word recognized", in which case the logic link takes place by way of the AND gate 81. The release signals for the clock pulse train at the shift register 73, therefore either the output signal of the RS flip-flop 76 or the frame clock pulse train RT from the clock pulse supply train 1, are logic linked to the OR gate 77 and forwarded to the D-flip-flop 79 which is pulsed by way of the inverter 78. By way of the AND gate 80, the output signal of this D-flip-flop 79 supplies the clock pulse train T/4 for the shift register 73.

Accordingly, the clock pulse train T/4 is continuously connected to the shift register 73 when the arrangement is non-synchronous and the information "no frame code word recognized" is stored in the D-flip-flop 84. One clock pulse T/4 occurs in respect of each frame when the arrangement is synchronous or the D-flip-flop 84 has stored the information "frame code word recognized".

In the monitoring arrangement 75, the RS flip-flop 90 stores the information as to whether the arrangement is synchronous or non-synchronous. It is synchronous when three frame code words have been correctly recognized in succession. This is the case when the AND gate 89 emits a signal. If four frame code words fail to be recognized in succession, and thus the NOR gate 88 emits a signal and resets the RS flip-flop 90, the arrangement is non-synchronous.

With the first frame code word which is recognized, in the D-flip flop 84, the signal changes from the logic state "0" to the logic state "1". One bit later, the $\overline{Q}$ output of the D-flip-flop 82 in the setting pulse arrangement 74 changes from the logic state "1" to the logic state "0". As a result of the logic link of these two signals with the AND gate 83, the setting pulse 51 is available for the clock pulse supply unit 27 with a width of one bit.

FIG. 7 represents the code 18 which converts a decimal code in accordance with the following table into a dual code.

| 58/Q | 59/Q | 60/Q | 61/Q | K1 | K2 |
|------|------|------|------|----|----|
| H | L | L | L | L | L |
| L | H | L | L | H | L |
| L | L | H | L | L | H |
| L | L | L | H | H | H |
| L | L | L | L | Z | Z |

The logic states H ≙ high level and L ≙ low level at the Q outputs of the D-flip-flops 58–61 are represented on the left-hand side, and those at the outputs 19 and 20 of FIG. 5 are represented on the right-hand side. The character Z signifies a highly-ohmic state.

The coder 18 comprises two NOR gates 91 and 92 which possess three state outputs, and one OR gate 93.

Figure 8:
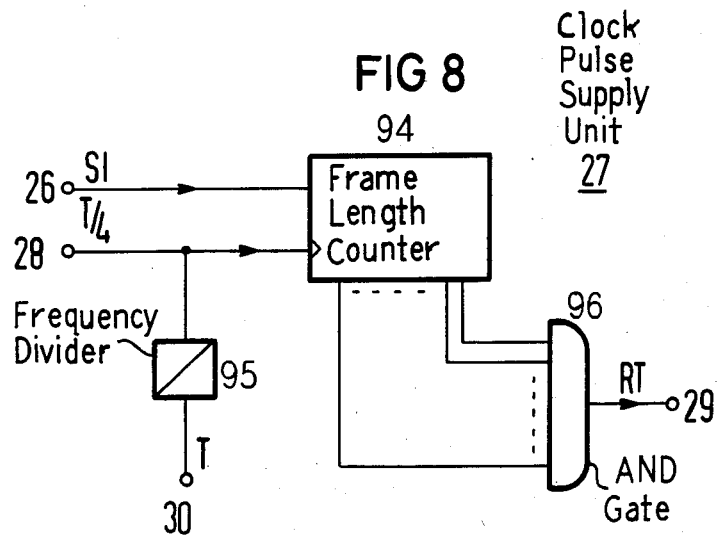
FIG. 8 is a schematic illustration of a clock pulse supply unit.

FIG. 8 illustrates the clock pulse supply unit 27, together with a frame length counter 94, a frequency divider and an AND gate 96.

The frame length counter 94 counts the number of bits per channel which occur in one frame. If a frame code word is discovered during the non-synchronous state, the setting pulse S1 sets the frame length counter 94 at a starting value. If a new frame code word is expected, the AND gate 96 emits a frame clock pulse RT which has a width of one bit.

Figure 9:
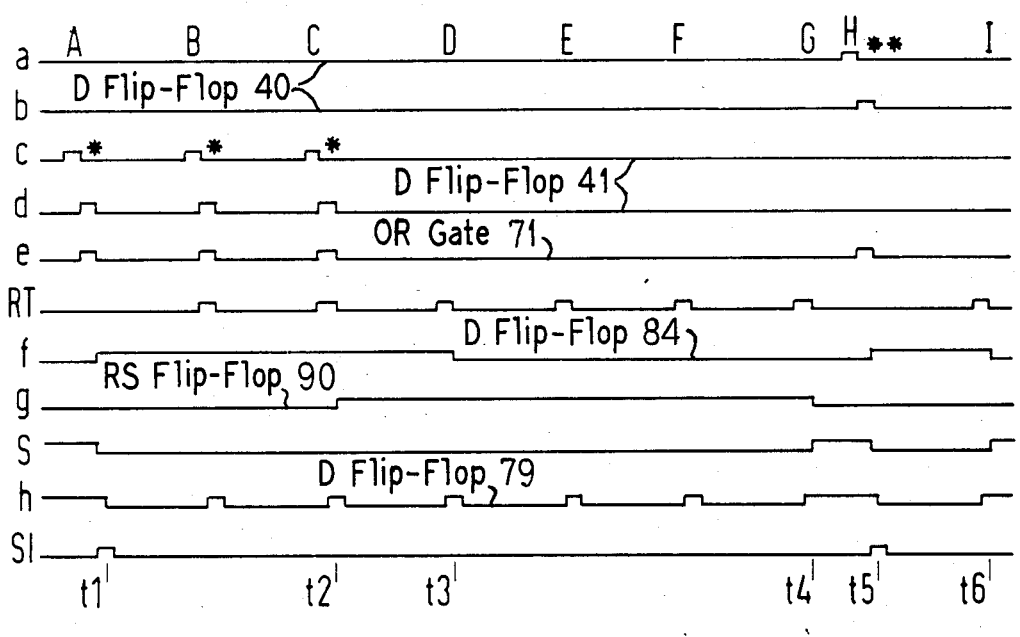
FIG. 9 is a pulse schedule illustrating the mode of operation of the synchronization.

The pulse schedule illustrated in FIG. 9 represents fundamental operational pulse flows in which:

a is the logic state at the input of the D-flip-flop 55;
b is the logic state at the output of the D-flip-flop 55;
c is the logic state at the input of the D-flip-flop 56;
d is the logic state at the output of the D-flip-flop 56;
e is the logic state at the output 22 of the OR gate 71 and thus of the logic linking arrangement 21;
f is the logic state at the output of the D-flip-flop 84 in the shift register 73;
g is the logic state at the output of the RS flip-flop 90 in the monitoring arrangement 75; and
h is the logic state at the output of the D-flip-flop 79 in the drive arrangement 72.

In FIG. 9 certain operating states are referenced A–I where:

A represents the first recognized frame code word;
B represents the second recognized frame code word;
C represents the third recognized frame code word;
D represents the first non-recognized frame code word;
E represents the second non-recognized frame code word;
F represents the third non-recognized frame code word;
G represents the fourth non-recognized frame code word;
H represents the first frame code word which is again recognized; and
I represents the second frame code word which is now not recognized.

Hunting takes place during the period up to the time t1. During the interval between t1 and t2 synchronism is achieved, i.e. a frame code word is discovered three times in succession. Until the time t2, the arrangement is non-synchronous. During the interval between t2 and t4 the arrangement is synchronous. During the interval between t3 and t4 synchronization is lost, i.e. no frame code word is discovered four times in succession. From the time t4 forward, the arrangement is again non-synchronous. During the interval from t4 to t5 hunting takes place, during the interval from t5 to t6 synchronization is achieved, and from the time t6 forward hunting again takes place.

In FIG. 9 (*) signifies that the first bit of the frame code word occurs in the third channel of the memory 7. Further, () signifies that the first bit of the frame code word occurs in the second channel of the memory 7**. The frame length has been considerably shortened in the representation, and for clarity and simplicity, the gate transit times have not been taken into account.

The clock pulse train T/4 can be obtained from the clock pulse train T at the input-end time multiplex signal by way of an amplifier, a phase shift device and a 4:1 frequency divider.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. An arrangement for synchronizing outgoing channels at the outputs of a demultiplexer by frame code words received as blocks in an incoming channel of a time-division multiplex system, comprising:

a demultiplexer comprising an input for receiving the time-division multiplexed signal, a chain circuit connected to said input and including n−1 delay elements, each having a one bit delay of the time, and a plurality of taps including said input as a zero delay tap, and a first memory comprising n D flip-flops each including an input connected to a respective tap and an output defining a respective channel;

a transmission path including an input connected to said outputs of said D flip-flops for receiving frame code words from said channels, an output for providing synchronized outgoing channels, a second memory connected to said input, a third memory connected to said second memory, a channel distributor connected to said third memory, and a fourth memory connected between said channel distributor and said outputs and a control path comprising a decoder connected to said second memory for decoding frame code words, a fifth memory connected to said decoder, a sixth memory connected to said fifth memory and including a switch through output, a logic linking arrangement connected to said fifth and sixth memories, for recognizing frame code words, a frame counter connected to said logic linking arrangement for counting frames and connected to said logic linking arrangement and to said sixth memory to cause switch through of a corresponding channel predetermined in response to the recognition of a number of frame code words, and a coder connected to said switch through output and to said channel distributor for causing synchronous distribution of the output channels via said fourth memory.

2. The arrangement of claim 1, wherein:
each of said delay elements comprises a conductor element having a surge impedance of 50 ohm.

3. The arrangement of claim 1, wherein:
each of said delay elements comprises a conductor element having a surge impedance of 60 ohm.

4. The arrangement of claim 1, wherein:
each of said delay elements comprises a conductor element having a surge impedance of 75 ohm.

5. The arrangement of claim 1, wherein:
said delay elements are cable sections.

6. The arrangement of claim 1, wherein:
said delay elements comprise strip lines.

7. The arrangement of claim 6, and further comprising:
a carrier supporting said strip lines and having a shortening factor in the range of 3 to 5.

8. The arrangement of claim 1, wherein four outgoing channels are synchronized with a twelve-digit frame code word, and wherein:
said second memory comprises first, second, third and fourth channels each including D-flip-flops Q and $\overline{Q}$ outputs,
said first channel including first, second, third and fourth series-connected D flip-flops connected in the order Q-D, Q-D, $\overline{Q}$-D;
said second channel including first, second, third and fourth series-connected D flip-flops connected in the order Q-D, $\overline{Q}$-D, Q-D;
said third channel including first, second, third and fourth series-connected D flip-flops connected in the order Q-D, $\overline{Q}$-D, Q-D; and
said fourth channel including first, second and third series-connected D flip-flops connected in the order Q-D, $\overline{Q}$-D.

9. The arrangement of claim 8, wherein:
each of said third and fourth memories comprises first, second, third and fourth channels and for each channel, a D flip-flop including a Q output and a clock input connected to the like clock inputs of the other D flip-flops of said third and fourth memories.

10. The arrangement of claim 9, wherein:
said channel distributor comprises first, second, third and fourth multiplexers each including an output, control inputs connected to said coder, and first, second, third and fourth inputs,
said first input of said first multiplexer connected to said Q output of said third channel of said D flip-flop of said third memory,
said second input of said first multiplexer connected to said Q output of said second channel D flip-flop of said third memory,
said third input of said first multiplexer connected to said Q output of said first channel D flip-flop of said third memory,
said fourth input of said first multiplexer connected to said Q output of said fourth channel D flip-flop of said third memory,
said first input of said second multiplexer connected to said Q output of said second channel D flip-flop of said third memory,
said second input of said second multiplexer connected to said Q output of said first channel D flip-flop of said third memory,
said third input of said second multiplexer connected to said Q output of said fourth channel D flip-flop of said third memory,
said fourth input of said second multiplexer connected to said Q output of said second channel fourth D flip-flop of said second memory,
said first input of said third multiplexer connected to said Q output of said first channel D flip-flop of said third memory,
said second input of said third multiplexer connected to said Q output of said fourth D flip-flop of said third memory,
said third input of said third multiplexer connected to said Q output of said third channel fourth D flip-flop of said second memory,
said fourth input of said third multiplexer connected to said Q output of said second channel fourth D flip-flop of said second memory,
said first input of said fourth multiplexer connected to said Q output of said fourth channel D flip-flop of said third memory,
said second input of said fourth multiplexer connected to said Q output of said third channel fourth D flip-flop of said second memory,
said third input of said fourth multiplexer connected to said Q output of said second channel fourth D flip-flop of said second memory, and
said fourth input of said fourth multiplexer connected to said Q output of said first channel fourth D flip-flop of said second memory.

11. The arrangement of claim 10, wherein:
said decoder comprises first, second, third and fourth AND gates each including an output connected to said fifth memory and each including a plurality of inverting inputs selectively connected to said outputs of said D flip-flops of said second memory, wherein said inputs of said first AND gate are connected to said outputs of said second, third and fourth D flip-flops of said first channel, to said outputs of said first, second and third D flip-flops of said second, third and fourth channels, said $\overline{Q}$ output being used for said third D flip-flop of said first channel and said second D flip-flop of said third channel and said Q outputs used for all other such connections to said first AND gate, said inputs of said second AND gate are connected to said outputs of said second, third and fourth D flip-flops of said second and third channels, and to said outputs of said first, second and third D flip-flops in said third and fourth channels, where said $\overline{Q}$ output is used for the connection of said second D flip-flop in said fourth channel and said Q output is used for the remainder of such connections to said second AND gate, said inputs of said third AND gate are connected to said outputs of said second, third and fourth D-flip-flops in said first, second and third channels, and to said outputs of said first, second and third D flip-flops in said fourth channel, where the $\overline{Q}$ output is used for the connection of said third D flip-flop in said first and second channels, and said Q output is used for the remainder of such connections to said inputs of said third AND gate, and said inputs of said fourth AND gate are connected to said outputs of said first, second and third D flip-flops in said first, second, third and fourth channels, where said $\overline{Q}$ output is used for said third D flip-flop of said first channel and for said second D flip-flop of said fourth channel and said Q output used for the remainder of said such connections of said inputs of said fourth AND gate.

12. The arrangement of claim 11, wherein:
said fifth memory comprises four channels each including a D flip-flop respectively connected to said outputs of said AND gates of said decoder, each of said D flip-flops comprising a Q output, and a clock input connected in common with the other D flip-flops of said fifth memory.

13. The arrangement of claim 14, wherein:
said sixth memory comprises four channels each including a respective D flip-flop connected to said Q output of a corresponding D flip-flop of said third memory, and a clock input connected in common with the other D flip-flops of said sixth memory; and a fifth AND gate including an output connected to said clock inputs of said D flip-flops of said sixth memory, a first input connected to receive a clock pulse and a second input connected to receive a control pulse.

14. The arrangement of claim 13, wherein:
said logic linking arrangement comprises four channels each including an OR gate having an output, a first input connected to said Q output of a respective D flip-flop of said sixth memory and a second input connected to said second input of said fifth and gate for receiving a control signal; and an AND gate including an output, a first input connected to said output of the respective OR gate and a second input connected to said Q output of the respective D flip-flop of said fifth memory, and a further OR gate including an output and four inputs connected to said outputs of said AND gates of said logic linking arrangement.

15. The arrangement of claim 14, wherein:
said frame counter comprises a shift register including an input connected to said output of said common OR gate of said logic linking arrangement, a plurality of D flip-flops each including a Q output corresponding to the number of channels in said transmission path, said arrangement further comprising a clock pulse supply unit, said frame counter further including a drive arrangement connected to said clock pulse supply and connected to drive said shift register;

a setting pulse arrangement connected to said clock pulse supply unit and operated by said clock pulse supply arrangement and the first D flip-flop of said shift register, and a monitoring arrangement connected to said Q outputs of said shift register and responsive thereto to emit the signal when three successive frame code words have been recognized.

16. The arrangement of claim 1, wherein:
said arrangement is constructed to operate at a bit rate of 565 Mbit/s in the incoming channel.

* * * * *